United States Patent [19]  [11]  4,233,495
Scoville et al.  [45]  Nov. 11, 1980

[54] FOOD WARMING CABINET

[75] Inventors: John R. Scoville, Butler; Richard W. Gigandet, Fort Wayne, both of Ind.

[73] Assignee: Lincoln Manufacturing Company, Inc., Fort Wayne, Ind.

[21] Appl. No.: 969,814

[22] Filed: Dec. 15, 1978

[51] Int. Cl.³ .......................... F24C 7/10; F24C 15/32
[52] U.S. Cl. ............................. 219/386; 126/21 A; 219/400; 312/236
[58] Field of Search ............... 219/400, 385, 386, 387; 126/21 A; 34/201, 202, 218, 219, 224–226, 231–233; 312/236; 99/474, 483

[56] References Cited

U.S. PATENT DOCUMENTS

| 1,398,542 | 11/1921 | Forshee . | |
|---|---|---|---|
| 1,930,394 | 10/1933 | Lockyer . | |
| 2,408,331 | 9/1946 | Mills | 312/236 |
| 2,715,898 | 8/1955 | Michaelis et al. | 219/400 |
| 3,286,370 | 11/1966 | Hope | 34/225 |
| 3,288,129 | 11/1966 | Fox | 126/21 A |
| 3,443,063 | 5/1969 | Berger et al. . | |
| 3,780,794 | 12/1973 | Staub | 126/21 A |
| 3,820,525 | 6/1974 | Pond | 219/400 |
| 3,839,622 | 10/1974 | Mastin | 126/21 A |
| 3,855,451 | 12/1974 | Lee | 219/400 |
| 3,962,962 | 6/1976 | Anderson | 99/474 |
| 4,010,341 | 3/1977 | Ishammar | 219/400 |
| 4,024,377 | 5/1977 | Henke | 219/439 |

Primary Examiner—B. A. Reynolds
Assistant Examiner—Bernard Roskoski
Attorney, Agent, or Firm—Albert L. Jeffers; John F. Hoffman

[57] ABSTRACT

The invention relates to a cabinet in which food packages, such as prepared school lunch packages, can be heated prior to serving, and maintained at a desired temperature before and during serving. The cabinet comprises an upwardly opening well closed by removable lids, a housing connected to and surrounding the well on the sides and bottom thereof and being spaced from the well so as to form a substantially enclosed air circulation chamber adjacent the sides and bottom, and a plurality of louvers in the side walls defining air inlets and outlets between the well and air chamber. Electrical heating elements are mounted within the air chamber directly below the bottom of the well so that heat generated thereby will radiate upwardly thereby heating the well bottom and, to a lesser extent, the well side walls. A thermally conductive baffle plate is disposed within the air chamber beneath the bottom of the well and functions as a heat sink to disperse and even out the radiant heat. An air circulation system comprising a pair of blowers for circulating the air over the heating elements and through the air chamber into the interior of the well through the side wall louvers.

11 Claims, 6 Drawing Figures

FOOD WARMING CABINET

BACKGROUND OF THE INVENTION

The present invention relates to food warming devices, and in particular to cabinets wherein large quantities of prepackaged, prepared foods can be heated to the desired temperature and maintained at this temperature during serving.

In institutions where food is served, such as schools, hospitals and cafeterias, the meals are often prepared in advance, prepackaged and mechanically refrigerated. In order to be able to handle the large number of meals so that they may be served at about the same time, it is necessary that the packages of food be brought to the serving temperature quickly and in bulk, and then maintained at the serving temperature during the serving operation.

One of the problems connected with a meal preparation and serving operation such as this is bringing the foods up to the temperature quickly enough, while at the same time heating the food packages uniformly so as to avoid some of the meals being uncooked whereas others are overcooked or burned. Many prior art cabinets have been constructed to receive a large number of packages of food and then heat them by the circulation of heated air, but the heating has not always been sufficiently uniform to maintain the desired temperature throughout the cabinet. This is an especially difficult problem where a large number of food packages must be heated, because some of the packages are nearer the walls of the cabinet, and will therefore be heated more quickly than those at the center. Even with good circulation of the heated air, the food packages nearest the cabinet walls will reach a higher temperature than those at the center, and this may result in overheating of the outermost packages of food.

A further problem with some prior art heating cabinets is that the heated air is conducted to the interior of the cabinet in such a manner that a substantial amount of heat is lost through the duct work. This is especially true in cabinets where the heating and blower units are mounted beside the food well where it is possible for the heat to radiate upwardly and be lost. Although locating the heating elements below the food well will eliminate much of the radiant heat loss, this can cause hot spots on the bottom of the food well so that the lowermost packages may be overheated or even burned.

SUMMARY OF THE INVENTION

In order to overcome the disadvantages of the prior art heating cabinets, the present invention provides a heating cabinet wherein the food is heated by both convection heat and radiant heat, and the ducting for the convection heat is formed as an air chamber surrounding the sides and bottom of the food well. The heating elements are located beneath the food well, and a thermally conductive baffle plate is interposed between the elements and the bottom surface of the well. The baffle plate functions as a heat sink to disperse and even out the radiant heat thereby preventing hot spots on the bottom of the well.

Air circulation is accomplished by means of a pair of blowers, which are positioned at opposite ends of the cabinet and direct respective streams of air over the heating elements and in opposite directions such that the streams inpinge on each other and then flow upwardly around the food well. Louvers in the food well side walls serve as the inlets and outlets for the heated air and air return.

Specifically, the present invention contemplates a food warming cabinet comprising: an upwardly opening well having side walls and a bottom, a housing connected to and surrounding the well on the sides and bottom thereof and being spaced from the well so as to form a substantially enclosed air chamber adjacent the sides and bottom of the well, a plurality of louvers in the side walls defining air inlets and outlets between the air chamber and the interior of the well, and heating elements within the air chamber and positioned directly under the well bottom whereby heat generated thereby will radiate upwardly to heat the bottom surface of the well. In order to provide convection heating, blower means are provided for circulating air over the heating elements and then through the air chamber and at least some of the louvers into the interior of the well, whereby food contained in the well will be heated.

It is an object of the present invention to provide a heating cabinet for packaged foodstuffs wherein heating is accomplished by both radiation and convection in such a manner that the temperature throughout the food well is substantially uniform.

A further object of the invention is to provide a food warming cabinet wherein thermostats measure the temperature of the circulating air immediately before it enters the food well, thereby ensuring more accurate and even heat regulation.

A still further object of the present invention is to provide a food warming cabinet wherein the convection air streams impinge on each other thereby improving the uniformity of the convection heating.

A still further object of the present invention is to provide a food heating cabinet where the convection air is ducted through an air chamber bounded on one side by the food well so as to minimize heat loss.

These and other objects of the present invention will be apparent from the detailed description considered together with the appropriate drawings.

BRIEF DESCRIPTION OF THE DRAWINGS

FIG. 6 is a sectional view taken along line 6—6 of FIG. 3 and viewed in the direction of the arrows.

DETAILED DESCRIPTION

Figure 1:
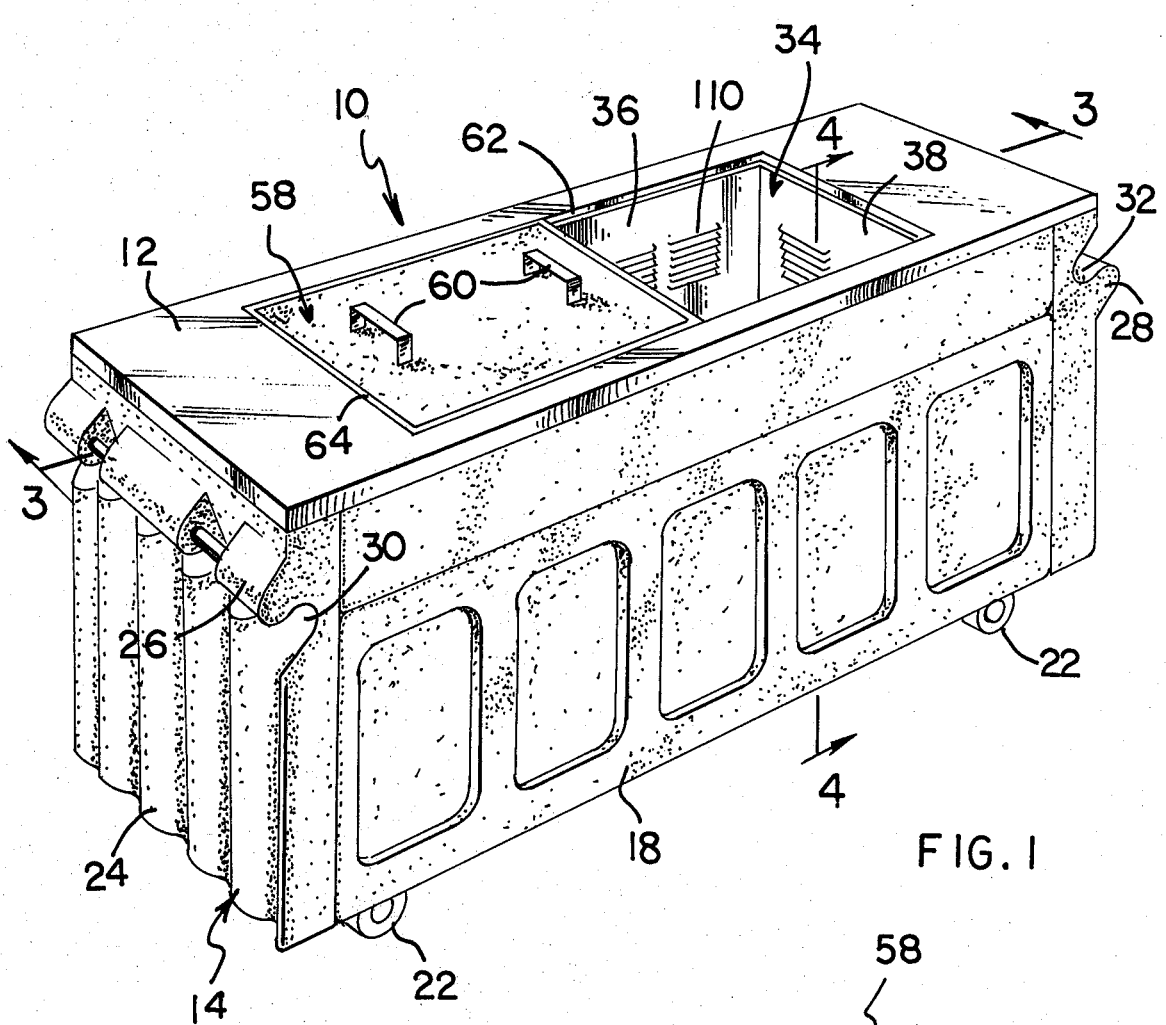
FIG. 1 is a perspective view of the food warming cabinet according to the present invention with one of the lids removed.
Figure 2:
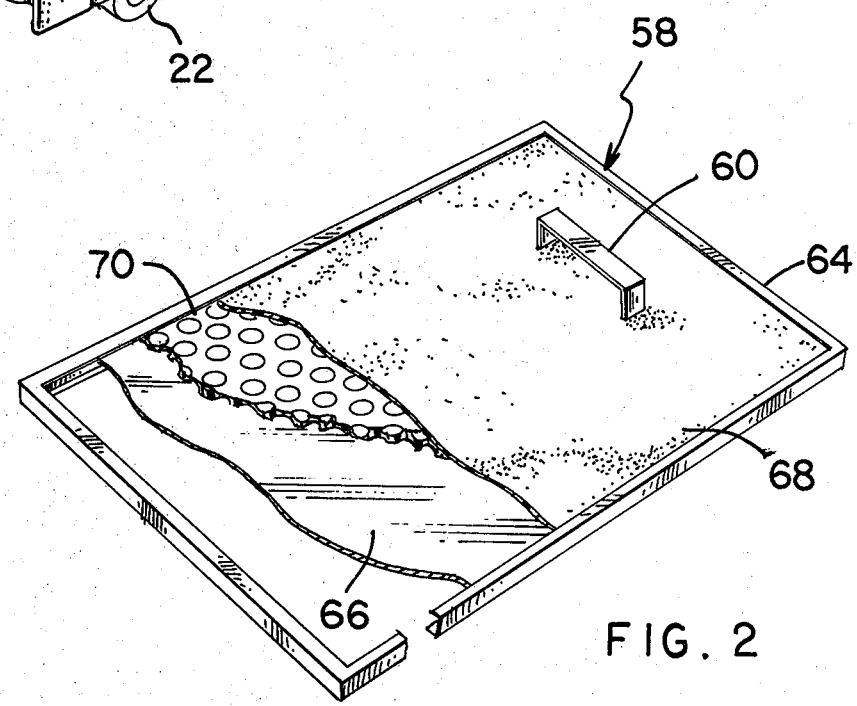
FIG. 2 is a perspective view of one of the lids with portions thereof broken away to illustrate the details of construction.

Referring now to the drawings in detail, the food cabinet 10 embodying the present invention comprises a top counter surface 12, a pair of end panels 14 and 16, and a pair of side panels 18 and 20. The cabinet is preferably provided with wheels 22 so as to enable it to be transported easily from one location to another. Each of the end panels 14 and 16 is formed with vertically extending, curved convolutions 24, which are shaped complementary to those on the opposite end 16 so that when two identical cabinets 10 are placed side by side, the convolutions 24 will interfit. The end panels 14 and 16 are further provided with curved tongue portions 26 and 28 and adjacent, complementary shaped recesses 30 and 32. The tongues 26 and 28 and recesses 30 and 32 are oriented and postioned such that when two cabinets 10 are placed adjacent each other, the tongue 26 or 28 of one cabinet will interfit with the recess 30 or 32 of the adjacent unit.

The end panels 14 and 16 and side panels 18 and 20 are preferably constructed of a molded thermal plastic of sufficient rigidity and strength to support the unit. The basic construction for the exterior of the cabinet 10 is described in greater detail in U.S. Pat. No. 4,008,931.

Formed in cabinet 10 is an upwardly opening food well 34 comprising sides 36, ends 38, and a bottom 40. Sides 36 are preferably formed in two parts, with the lower portion 42 being integral with bottom 40 and the upper portion 44 welded to lower portion 42 at 45. Ends 38 may either be formed integrally with bottom 40 or formed similarly to sides 36 wherein the upper portions are welded to the lower portions, the latter being formed integrally with bottom 40. The food well 34, which is a single rigid unit, is preferably made of stainless steel so as to resist corrosion and enable easy cleaning. Well 34, or at least the upper portions thereof, are preferably formed integrally with top 12 and are connected to end panels 14 and 16 by overhanging lips 46 and 47, and to side panels 18 and 20 by overhanging lips 48.

Figure 4:
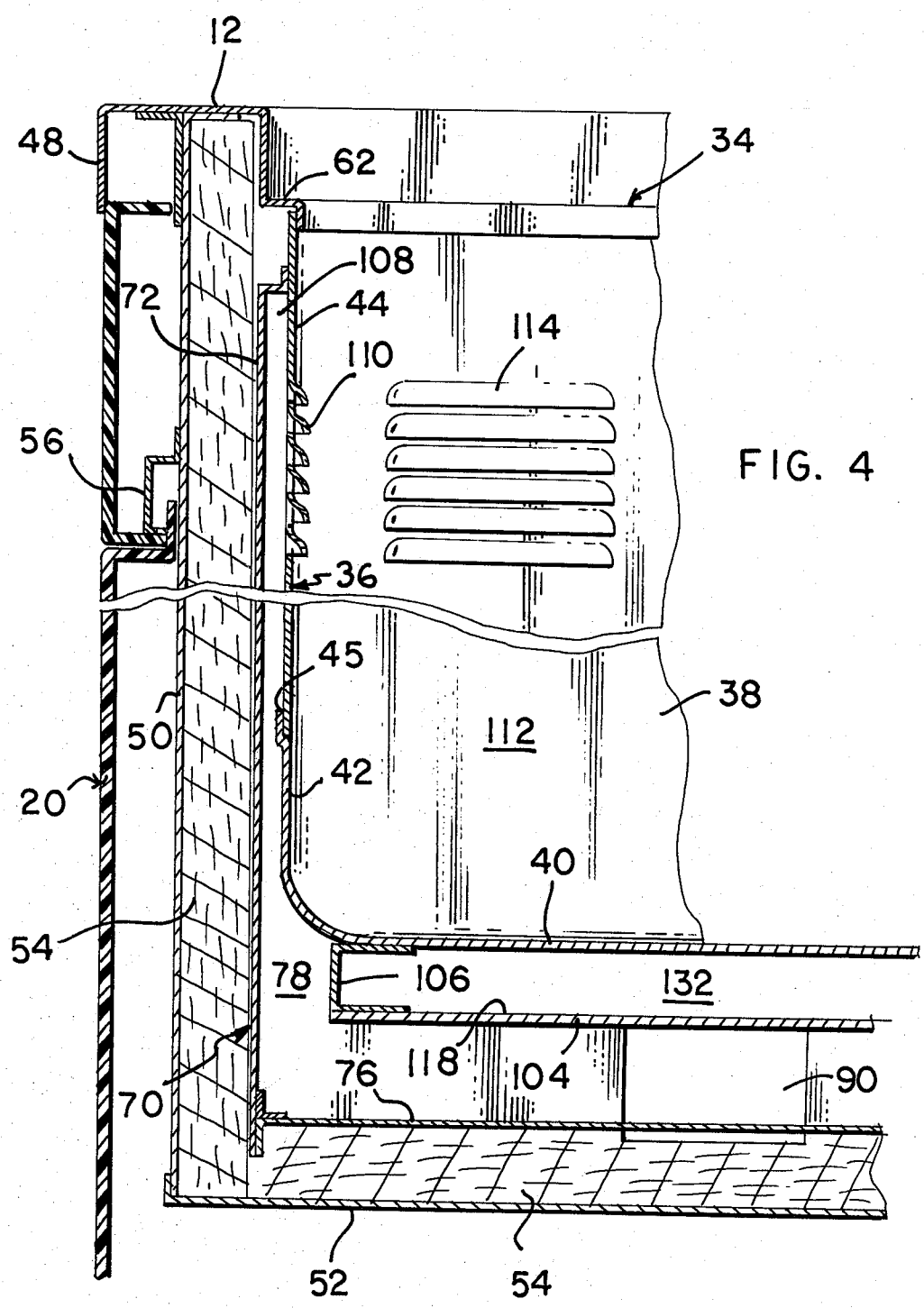
FIG. 4 is a fragmentary sectional view taken along line 4—4 of FIG. 1 and viewed in the direction of the arrows.

Side structural members 50, which are formed of sheet steel, are rigidly connected to end panels 14 and 16 and extend the length of cabinet 10. A bottom plate 52 is welded to side structural members 50 and also extends the length of cabinet 10. Panels of thermal insulating material 54 are installed next to side structural members 50 and bottom 52, and serve to prevent the transmission of heat to end panels 14 and 16 and side panels 18 and 20. Side structural members 50 are provided with brackets 56, which interconnect with the side panels 18 and 20 in a manner illustrated in FIG. 4.

A pair of lids 58 having handles 60 are supported on ledge 62 formed in food well 34 and extend about the perimeter thereof. Each of the lids 58 comprises a rectangular outer frame 64 supporting a pair of planar panels 66 and 68 between which is sandwiched a panel of honeycomb insulating material 70 made of LEXAN, a cellulose material, or the like. The purpose of panel 70 is to provide thermal insulation for well 34 when the lids 58 are in place.

Welded or riveted to well 34 is a rectangular steel housing 70 comprising sides 72, ends 74 and a bottom 76. Housing 70 is positioned adjacent insulating panels 54, and is spaced from food well 34 so as to form an air chamber 78 surrounding the sides and bottom of well 34. Housing 70 is preferably formed of two parts, which are joined at their ends by steel plates 81 welded thereto. The ends 74 of housing 70 are at least partially open, as illustrated in FIG. 6, with air return ducts 80 and 82 secured to housing ends 74 as by welding or by riveting. The bottom 84 and 85 of return ducts 80 and 82 include openings 86 and 88, respectively. A blower unit 90 driven by electric motor 92 is fastened to the bottom 84 of return duct 80. When the fan 94 of blower unit 90 is rotated, air will be drawn from return duct 80 and directed into heating chamber 96 through opening 98 in plate 80. A similar motor-driven blower unit 100, which is secured to the bottom 85 of return duct 82, draws air from duct 82 and directs it through opening 102 in plate 81 into heating chamber 96.

Heating chamber 96 is formed between the bottom 76 of housing 70 and the bottom 40 of food well 34. An aluminum baffle plate 104 is secured to and spaced from the bottom 40 of food well 34 by means of rectangular spacer frame 106. Spacer frame 106 may be welded to bottom 40, and baffle plate 104 riveted or otherwise secured to spacer frame 106. It will be noted that baffle plate 104 is generally parallel to and coextensive with the bottom 40 of well 34 so that there is open communication between the heating chamber portion 96 of air chamber 78 and the vertical side chamber portions 108.

Hot air inlet louvers 110 are formed in the sides 36 of well 34 and provide fluid communication between side chambers 108 and the interior 112 of well 34. In the specific embodiment illustrated, twelve sets of inlet louvers 110 are provided wherein the individual louvers are approximately six inches in length, and are spaced vertically at one inch intervals. In a similar fashion, air return louvers 114 are formed in the ends 38 of well 34 and provide fluid communication between the interior 112 of well 34 and air return ducts 80 and 82. Four sets of such louvers are provided, wherein the individual louvers are six inches in length and vertically spaced at 13/16 inch intervals.

Figure 3:
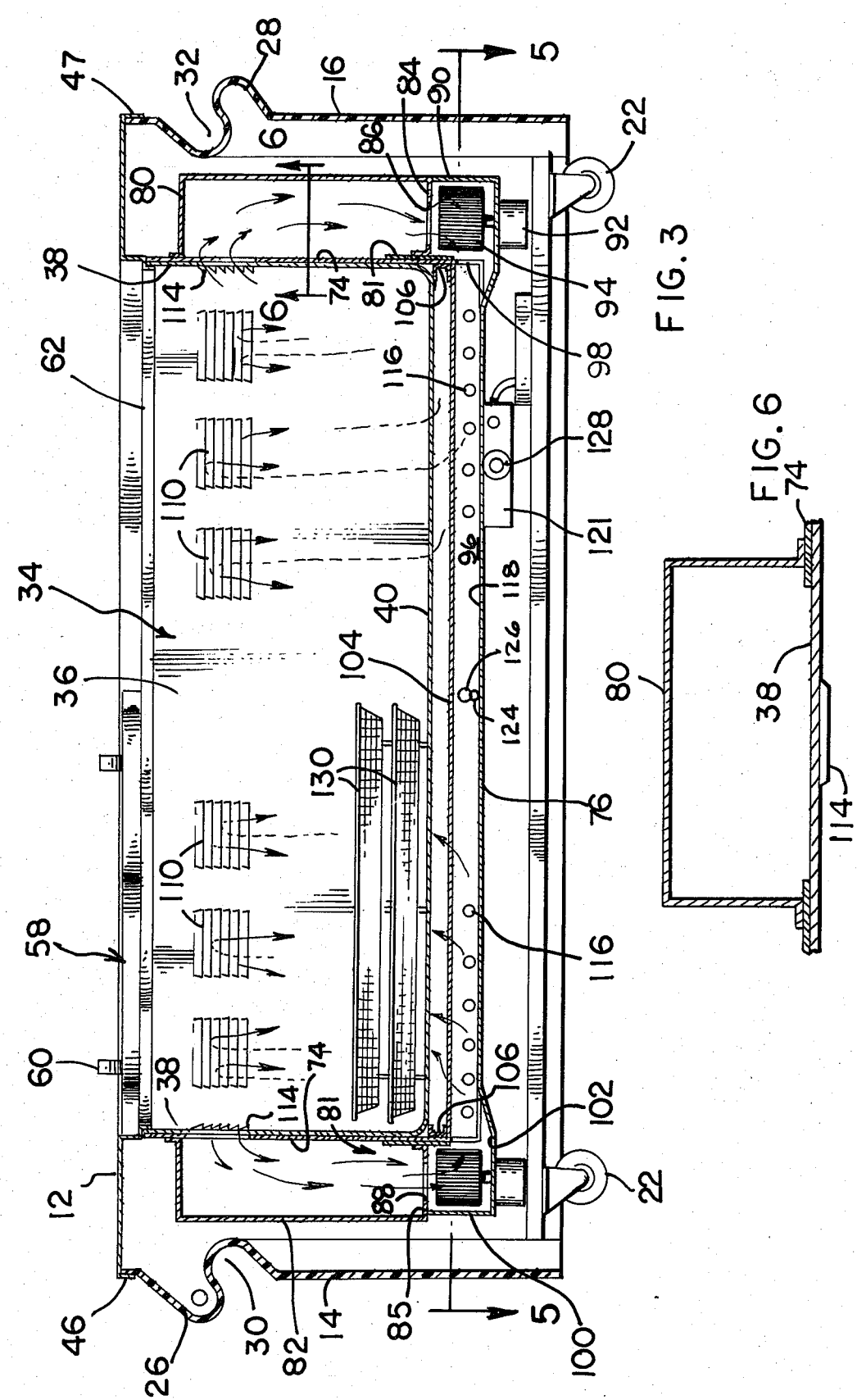
FIG. 3 is a sectional view taken along line 3—3 of FIG. 1 and viewed in the direction of the arrows.
Figure 5:
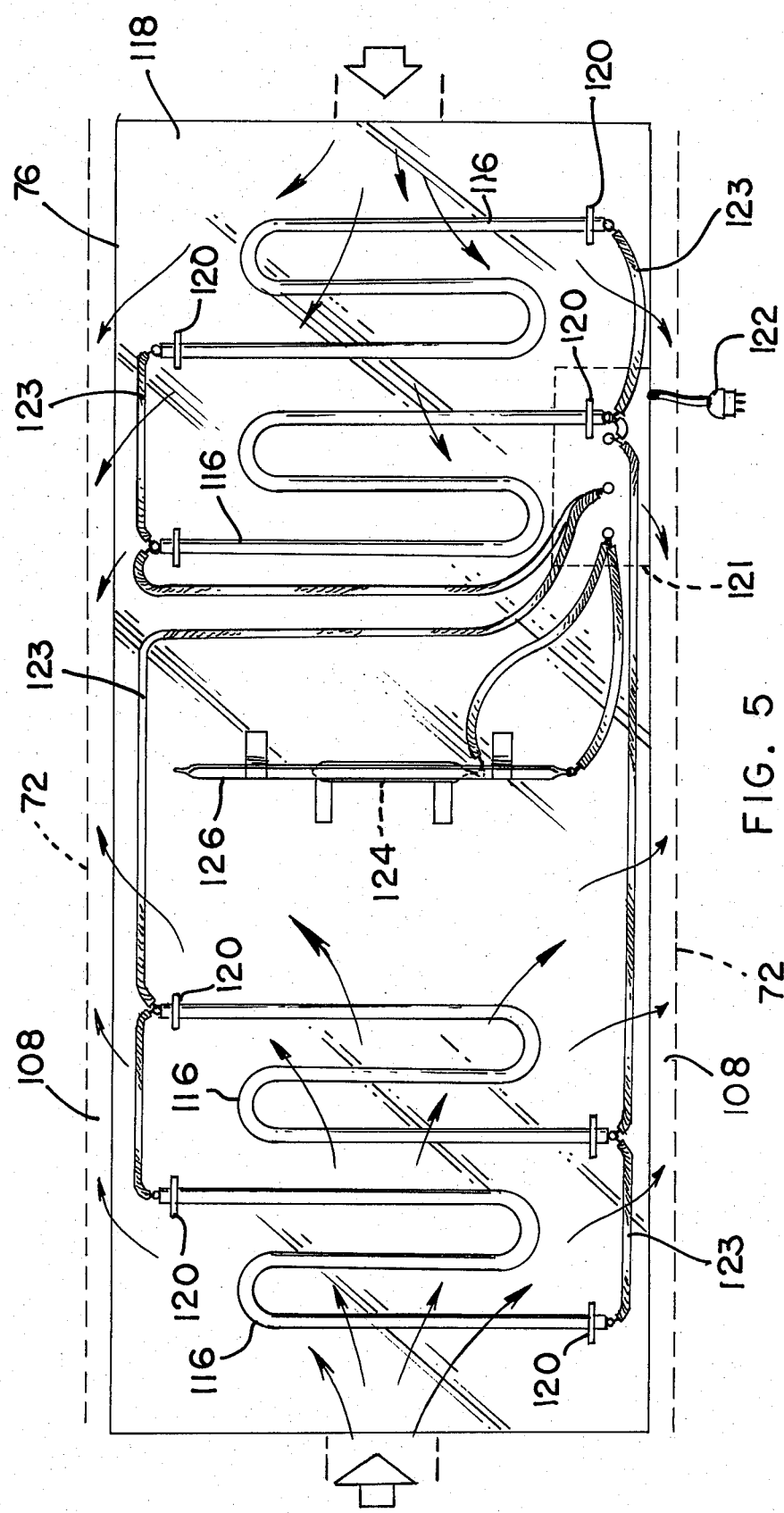
FIG. 5 is a plan view of the heating chamber showing the heating elements and thermostat.

With specific reference to FIGS. 3 and 5, electrical resistance heating elements 116 are mounted to the inner surface 118 of bottom plate 76 by means of brackets 120. Brackets 120, which are rigidly fastened to bottom plate 76, serve to space heating elements 116 from surface 18. Heating elements 116 are connected by wires 123 to a control unit 121 which, in turn, is connected to a source of external current carried by wires 122. Dual thermostats 124 and 126 are also connected to control unit 121, and control the amount of current supplied to heating elements 116 depending on the temperature sensed thereby. Thermostat 126 may be adjusted by temperature control knob 128 to turn on or turn off the supply of current to heating elements 116 or, alternatively, control the amount of current supplied thereto. Thermostat 124 is an over temperature control, and interrupts the flow of current to heating elements 116 in the event a predetermined maximum temperature is exceeded. By positioning the temperature sensors 124 and 126 within the center of heating chamber 96, the temperature of the heated air is measured prior to its being admitted to the interior 112 of well 34. It is at this point that the two streams of air produced by blowers 90 and 100 are mixed, so the temperature sensed will be accurate for all of the heated air which flows into well 34.

In operation, lids 58 are removed and the prepackaged food packages are stacked on trays 130 which, in turn, are stacked within food well 34. Lids 58 are then replaced, and control knob 128 adjusted to provide the desired temperature level for the interior 112 of food well 34. The unit is then activated and blowers 90 and 100 draw air from the interior 112 of well 34 through louvers 114 into return air ducts 80 and 82. From here, the return air is blown through openings 98 and 102, across heating elements 116 toward the center of heating chamber 96. The two streams of heated air produced by blowers 90 and 100 impinge on each other so that mixing is achieved, and the streams then flow upwardly into the vertical chambers 108 formed between the sides 72 of housing 70 and the sides 36 of food well 34. The heated air then flows into the interior 112 of well 40 through side louvers 114. After passing over and around the food packages, the return air is again drawn into return ducts 80 and 82 for reheating in heating chamber 96.

The interior 112 of food well 34 is also heated by the radiant heat produced by heating elements 116. This heat rises and meets aluminum baffle plate 104, which acts as a heat sink and prevents the direct radiation of the bottom 40 of well 34. Baffle plate 104 is spaced from the bottom 40 of well 34 by a dead air space 132, which is dimensioned to cause the heat radiated by food well bottom 40 to be at substantially the same temperature as the air being directed inwardly to well 34 through inlet louvers 110. This feature is extremely important in that it avoids the presence of hot spots on the bottom surface 40 of well 34, and ensures that all of the heat input to the interior of food well 34 is at the same temperature. This ensures uniform heating for the entire food well 34, which is essential for maximum efficiency and proper heating of the food. Furthermore, the air flow pattern with the return air being pulled out of the ends of the food well 34 and admitted to the side louvers 110 results in extremely good circulation of the air so that all portions of the food well 34 are uniformly heated. Because the well 34 forms one boundary for air chamber 38, little heat is lost by radiation through the ducting.

While this invention has been described as having a preferred design, it will be understood that it is capable of further modification. This application is, therefore, intended to cover any variations, uses, or adaptations of the invention following the general principles thereof and including such departures from the present disclosure as come within known or customary practice in the art to which this invention pertains and fall within the limits of the appended claims.

What is claimed is:

1. A food warming cabinet comprising:
    an upwardly opening well having a pair of side walls, a pair of end walls and a bottom,
    a housing connected to said well and surrounding the well on the sides, ends and bottom thereof and being spaced from the well so as to form a substantially enclosed air chamber immediately adjacent the side and end walls and the bottom of said well,
    a plurality of inlet louvers in one of said pair of walls and a plurality of outlet louvers in the other of said pair of walls providing communication between said air chamber and the interior of said well,
    heating element means within said air chamber positioned beneath said well bottom so as to radiate heat upwardly to said well bottom,
    a thermally conductive baffle plate positioned between said heating element means and said well bottom, and
    a pair of blower means located at opposite ends of said air chamber for drawing air from the interior of said well through said outlet louvers and blowing the air across said heating element means in respective streams inpinging on each other in said air chamber beneath said well bottom, and causing the air heated by the heating element means to flow through the portion of the air chamber laterally adjacent said well and through said inlet louvers into the interior of said well.

2. The food warming cabinet of claim 1 wherein said heating element means comprises two heating elements disposed in a substantially horizontal plane and spaced outwardly from the center of said air chamber beneath said well bottom in directions toward said blower means, respectively.

3. The cabinet of claim 1 including thermostat means positioned in said air chamber beneath said well bottom and connected to said heating element means for controlling said heating element means in response to the air temperature in said air chamber beneath said well bottom.

4. The cabinet of claim 3 wherein said thermostat means is located generally in the center of said air chamber beneath said well bottom.

5. The cabinet of claim 1 wherein said baffle plate is constructed of aluminum.

6. The cabinet of claim 1 wherein said baffle plate is spaced from said well bottom and said blower means directs at least the major portion of the air circulated thereby below said baffle plate.

7. The cabinet of claim 6 wherein all of the air circulated by said blower means is directed below said baffle plate.

8. A food warming cabinet comprising:
    an upwardly opening well having side walls, end walls and a bottom,
    a housing connected to said well and surrounding said well on the sides, ends and bottom thereof and being spaced from said well so as to form a substantially enclosed air chamber immediately adjacent the side and end walls and the bottom of said well,
    a plurality of louvers in said side and end walls defining inlets and outlets, respectively, providing fluid communication between said air chamber and the interior of said well,
    heating element means within said air chamber positioned beneath said well bottom so as to radiate heat upwardly to said well bottom,
    a thermally conductive baffle plate positioned between said heating element means and said well bottom, and
    a pair of blower means located at opposite ends of said air chamber for drawing air from the interior of said well through said end wall louvers and blowing the air across said heating element in respective streams inpinging on each other in said air chamber beneath said well bottom, and causing the air heated by the heating element means to flow through the portion of the air chamber adjacent said well sides and through said side wall louvers into the interior of said well.

9. The cabinet of claim 8 wherein said baffle plate is generally coextensive with said well bottom and parallel thereto.

10. The cabinet of claim 8 wherein said louvers are positioned in the upper portion of said well and are downwardly directed.

11. The cabinet of claim 8 wherein the portions of said air chamber adjacent the side walls and the portion of said chamber adjacent the bottom of said well are in open communication.

* * * * *